United States Patent [19]

Gancy

[11] Patent Number: 4,673,519

[45] Date of Patent: Jun. 16, 1987

[54] LOW-ENERGY PROCESS FOR THE MANUFACTURE OF CALCIUM/MAGNESIUM ACETATE-CHLORIDE DEICERS AND FREEZING POINT DEPRESSANTS

[76] Inventor: Alan B. Gancy, 265 Robineau Rd., Syracuse, N.Y. 13207

[21] Appl. No.: 747,579

[22] Filed: Jun. 24, 1985

[51] Int. Cl.$^4$ .............................................. C09K 3/18
[52] U.S. Cl. .................................... 252/70; 562/607; 562/608
[58] Field of Search ................... 252/70; 562/607, 608

[56] References Cited

U.S. PATENT DOCUMENTS

| | | | |
|---|---|---|---|
| 4,377,488 | 3/1983 | Gancy | 252/70 |
| 4,389,323 | 6/1983 | Gancy | 252/70 |
| 4,425,251 | 1/1984 | Gancy | 252/70 |
| 4,511,485 | 4/1985 | Gancy | 252/70 |

*Primary Examiner*—Robert A. Wax

[57] ABSTRACT

Several novel means are presented of chemically combining calcium/magnesium acetate with calcium chloride to form a series of calcium magnesium acetate-chloride triple-salts. The low-cost processes are carried out using minimal proportions of water, and no co-products or by-products are formed. Products are optionally pelletized for use as roadway deicing agents. By adjusting the relative amount of chloride input, products can be tailored to adequately perform a given deicing or freezing-point depression task with a minimum of environmental pollution by chloride.

All product variations are non-deliquescent.

In the preferred embodiment, lime is reacted with concentrated acetic acid to form calcium/magnesium acetate. To the acetate is added an aqueous calcium chloride solution. The concentration of water in the reaction batch is critical to the attainment of complete chemical combination to form a flowable solid product.

15 Claims, No Drawings

LOW-ENERGY PROCESS FOR THE MANUFACTURE OF CALCIUM/MAGNESIUM ACETATE-CHLORIDE DEICERS AND FREEZING POINT DEPRESSANTS

BACKGROUND OF THE INVENTION

The subject matter of the invention relates to a novel form of calcium/magnesium acetate-chloride (CMAC), and the comparatively low-energy process for its manufacture.

The impetus for development, and the circumstances related to the discovery arose from the need to produce a non-dusting, low-friability calcium acetate-chloride of particle size distribution ideally suited to use as a roadway and walkway deicer. Especially important was the need for a product cost reduced to its barest minimum so that the product could compete with the use of salt (sodium chloride) in selected applications. Indeed, the single factor responsible for keeping calcium acetate and calcium acetate chloride from the marketplace up to now has been its chemical cost as compared to that of salt.

That there is a pressing need to replace salt as a deicer nationwide is well documented in the current publications of the U.S. Environmental Protection Agency (EPA) and the Federal Department of Transportation (DOT). In spite of their significant expenditures in research and development, to date there has been no economical substitute for salt. The present invention represents a major breakthrough in product costs as well as product practicality and versatility in the field of surface deicing.

In one of my U.S. Pat. No. 4,488,978 on calcium acetate I applied a new approach to the production of a material ideally suited to surface deicing, and at the same time characterised as the lowest cost route to such product conceived up to that time. The principles employed there were brought to bear on the present calcium acetate-chloride problem, but without success. Only after long and persistent research were the improved process variants described herein discovered.

In another of my U.S. Pat. No. 4,511,485 I teach for the first time the use of calcium acetate-chloride, a double salt, in roadway deicing. I also teach use of this compound as a depressant of the freezing point of water and the major applications of this principle such as in the field of refrigeration. But the double salt in all cases was produced by the process of crystallization from solution, or drying solution. And while such processes are industrially feasible, a major advance in manufacturing economics and product versatility is achieved as the subject of the present invention.

DESCRIPTION OF PRIOR ART

Salt (sodium chloride) is the most widely used roadway and walkway deicer in the U.S. today, with annual volumes exceeding 8 million tons. Salt is coming under increasing attack for environmental pollution. Both the sodium and the chloride are objectionable, but for different reasons. The EPA has estimated that damage to the environment annually, expressed in dollars, now amounts to about 14 times the total cost to dispense the salt. Thus salt is numbered as one of the more serious of polluters.

Calcium chloride ($CaCl_2$) is widely used as a deicer, but in very much lower tonnages. It will operate at temperatures much lower than those of salt. Furthermore, it gives off heat just upon dissolving in water, in contrast to salt. Also, it is more costly than salt. These factors combine to limit calcium chloride use to selected needs. The chloride component is the culprit in terms of environmental damage. The calcium component is not to be ignored, however: the compound calcium chloride is deliquescent, so that when it comes into contact with corrodible metal surfaces, it remains "wet" and thus accelerates the corrosion process dramatically. Furthermore, in considering the equivalent amount, or equiosmolar amount of $CaCl_2$ required to do a given deicing job, relatively more noxious chloride enters the environment than in the case of salt.

Calcium acetate (CA), or more specifically calcium/magnesium acetate (CMA) has evolved through DOT-sponsored research as a potential replacement for salt and for $CaCl_2$. Neither calcium nor acetate is considered damaging to the ecosystem. Indeed, several beneficial side benefits are projected upon distribution of calcium magnesium acetate into the environment. Government-sponsored CMA research is currently very active on two fronts: (1) its economical production, and (2) its effectiveness as a deicer, and its effects on the environment. As alluded to above, I believe I have discovered the lowest cost route to CMA to date, and this is under active commercial development. Even at best, the cost of CMA will be relatively high compared to that of salt, and only selected applications and limited market segments will see its use.

There are some drawbacks to CA which must be considered. It is more costly in its deicing function even than $CaCl_2$. Furthermore, its eutectic temperature is not particularly low, hence it is not a very good deicer. In fact, the reason that calcium/magnesium acetate (CMA) is being touted, and not CA, is that the magnesium acetate contained therein does have a lower eutectic than CA. Thus CMA is a better deicer than CA. But the production of CMA requires the raw material dolomitic limestone, which is relatively scarce compared to limestones in general, which contain lesser amounts of magnesium.

I have discovered that CA and CMA are relatively slow to dissolve in water. Salt and $CaCl_2$ dissolve much faster. Slow dissolution is a drawback in the deicing function. When some $CaCl_2$ is compounded with CA or CMA, the dissolution rate in water is increased dramatically. But more importantly, the compounding of $CaCl_2$ with CA or CMA dramatically lowers the net eutectic temperature of the agent. Thus, while incorporating chloride into CA or CMA may raise objections from the standpoint of pollution, the functioning of the deicer is dramatically improved. Furthermore, any $CaCl_2$ compounded with CA or CMA ends up in chemical compound form, not a physical mixture. The significance of this, I have found, is that such compounded materials are readily stored open to the ambient atmosphere without exhibiting the deliquescence normally associated with $CaCl_2$.

The process of the present invention is distinguished from the prior art in that as little $CaCl_2$ can be compounded into CA or CMA as is required to achieve a given desired improvement in its deicing function. The amount of $CaCl_2$ compounded has an upper limit of 1.0 in the mol ratio $CaCl_2/Ca(Ac)_2$, I have discovered, regardless of the magnesium content.

There is a trade-off, a situation often encountered when environmental pollution is debated. Thus, incorporating an amount of $CaCl_2$ into CA or CMA such that chloride pollution is reduced by as much as ten-fold compared to straight $CaCl_2$ will still result in a deicer which does a superior job to straight CA or CMA. In some cases this compounding would do the job, whereas straight CA or CMA would fail, i.e., they simply would not melt the ice because the ambient temperatures are so low.

The beneficial effects of compounding $CaCl_2$ into CA or CMA are manifold as compared to straight CA or CMA:

(1) a lowering of overall cost
(2) an increase in exothermicity, or the amount of heat evolved upon dissolution of the agent.
(3) a lowering of the eutectic temperature, or the increased ability to melt ice at lower temperatures.

These benefits must be balanced against the chloride pollution which results from incorporating $CaCl_2$. If balanced against straight CA or CMA by comparison, the consequences could be serious. That is, there may be situations in which no chloride whatsoever is tolerable in a given situation. On the other hand, when calcium/-magnesium acetate-chloride (CMAC) is compared to salt, or to $CaCl_2$, it comes out more favorably. For example, the use of straight $CaCl_2$ often represents "overkill"; its eutectic temperature is much lower than required in many applications. Hence the environment is unnecessarily polluted because of a deicing capability which wasn't even required. By compounding $CaCl_2$ with CMA or CA, however, the deicing power may be tailored to the local environmental conditions without unnecessarily contaminating with chloride.

Note also that compounding of $CaCl_2$ into CMA or CA according to the present invention never gives rise to deliquescence of the agent. Hence, the compounded form of $CaCl_2$ can be applied and advantage taken of its deicing strengths without at the same time accelerating metal corrosion as does straight $CaCl_2$. This non-deliquescence assumes importance in the storage and handling of CMAC for other end-uses as well, such as in the cost of freezing-point depression applications (refrigerants, e.g.).

Use of CMAC is also advantageous as compared to salt. Besides providing the exothermicity which aids the ice-melting function (salt gives an endothermic reaction) the use of CMAC can reduce the pollution of the environment by chloride. It is possible, for example, to reduce chloride pollution ten-fold compared to salt while providing adequate deicing under the local conditions prevailing. And, of course, CMAC introduces no sodium to the environment.

Hence the arguments in favor of CMAC applications to deicing are compelling. This gave rise to my efforts to produce a superior product at lower cost. My previous research involved CMAC as crystallized from solution, a widely practiced industrial approach to salts. While this approach is workable it does entail the formidable costs of crystallization, and separation of crystals from mother liquor. Besides, production of dewaterable crystals over all ranges of salt composition desired could be problematic. My copending application also teaches drying of CMAC solution, also a much more costly alternative to the present invention.

The present invention produces CMAC at low cost because it is essentially a "dry" process. The reaction batch is in the form of a flowable solid, even though liquids are introduced to the reactor. No separations are necessary because there are no reaction by-products. Furthermore, the product ends up as a dust-free, non-deliquescent, non-friable pellet. This is not only desirable as regards storage and handling for general use (e.g., as refrigerators), but happens to be ideal for deicing. It is well known that a deicing chemical in the form of flakes or pellets is much superior to crystals or powder (or even solution) insofar as effectiveness and efficiency are concerned.

As an option, the product can also be produced as a free-flowing coarse powder, i.e., the pelletization step can be eliminated. Such powder is also non-deliquescent.

Such pelletizing technology as applied to CA or CMA in one of my U.S. Pat. No. 4,488,978 was relatively simple, involving as it did the interaction of water with a simple chemical compound. In the use of CMAC, however, the situation was found to be much more complicated. The reason was that some reaction conditions failed to lead to complete chemical reaction of the acetate and chloride components. In the extreme one ended up with a single wet lump as a reaction batch. The chemical components were not necessarily compounded, but were indeed present as (partial) physical mixtures. This in turn gave rise to a product which exhibited a deliquescence akin to that of $CaCl_2$ alone. Only under very particular reaction conditions could complete chemical reaction between chloride and acetate be achieved and still preserve the low-energy character of the process. This indeed is the essence of the present invention.

OBJECTS OF THE INVENTION

The main object of the invention is to provide a lower cost route to calcium/magnesium acetate-chloride (CMAC) than has been available heretofore.

It is a further object of the invention to produce a low cost CMAC product with a wide range of chloride content, from greater than zero up to and including the limit of 1.0 in the mol ratio $CaCl_2/Ca(Ac)_2$.

It is another object to produce a relatively non-polluting deicer.

Another object is to produce CMAC in a physical form which is ideal to the ice-melting function.

It is further object to produce a deicer which is non-friable and therefore adaptable to industrial storage and handling.

Another object is to produce a $CaCl_2$-containing solid which is non-deliquescent.

Still another object of the invention is to produce a compound having a wide range of magnesium content ranging from greater than zero to 1.0 in the mol ratio Mg/Ca.

A further object is to provide a low cost process for manufacturing a highly effective deicer and freezing point depressant from any limestone type regardless of magnesium content.

Another object is to provide a freezing point depressant in solid form for economy in shipping and storage.

A further object is to produce a $CaCl_2$-containing compound which is much less corrosive to metals than $CaCl_2$.

Another object is to provide a manufacturing process which can tailor the CMAC deicer product to satisfy a wide range of tradeoffs between ice-melting effectiveness and environmental pollution.

It is further object to provide an improved process for the manufacture of CMAC wherein there are no by-products or co-products.

It is still further object of the invention to produce CMAC while avoiding costly crystallization or solution-drying steps.

It is another object of the invention to avoid costly evaporation steps in the economical production of CMAC.

Other objects of the invention will become evident as the invention is hereinafter described.

SUMMARY OF THE INVENTION

Finely divided calcium acetate (CA) is intimately blended with finely divided calcium chloride dihydrate, and water is then added with agitation until pellets are formed. Pellets are then partially or completely dried to produce the final product.

Another approach is to dry-blend $Ca(OH)_2$ and $CaCl_2.2H_2O$, then add sufficient acetic acid to convert the hydroxide completely to acetate. To this dry, flowable solid is then added water sufficient to form good pellets. Pellets are then dried. Such products are not completely homogeneous, as evidenced by the non-uniform coloration of pellets from trace iron impurity. Furthermore, they do not store well in ambient atmosphere; the pellets tend to soften and disintegrate. This problem is to some degree solved by using at least a ~10% stoichiometric excess of $Ca(Ac)_2$ over $CaCl_2$ in the synthesis. The advantage of this approach over the first one is that a $Ca(Ac)_2$ drying step is avoided, the $Ca(Ac)_2$ in this case being the in situ product of reaction between $Ca(OH)_2$ and acetic acid. That is, when $Ca(Ac)_2$ is not available and must be produced from $Ca(OH)_2$, this approach is to be preferred over the first one.

Alternatively, to a charge of calcium/magnesium hydroxide is slowly added with stirring a solution containing acetic acid and calcium chloride in the correct stoichiometric proportions. Product is optionally treated with water to form pellets, then dried.

A still more versatile approach is a two-step process. First, calcium/magnesium hydroxide is reacted with stoichiometric amount of concentrated acetic acid. To the product of that reaction is slowly added the desired amount of calcium chloride as aqueous solution. Solution concentration is critical. Product is optionally treated with water to produce pellets, and is then dried.

All four approaches are simply variations on the same basic process—reaction between calcium acetate and calcium chloride in the presence of a minimal amount of water.

Products containing little or no magnesium can be easily dehydrated to anhydrous form at 100° C. Products rich in magnesium are not easily rendered anhydrous, and need not be so treated to form stable, non-deliquescent products.

Upon exposure to ambient atmosphere all products whether "wet" or dried will seek a particular stable equilibrium hydrated state, depending upon their composition. In no case is there a deliquescent product transition stage in the approach to equilibrium.

The present invention provides evidence for a series of stable triple-salts of magnesium acetate, calcium acetate and calcium chloride. These have not been reported heretofore.

DESCRIPTION OF THE PREFERRED EMBODIMENTS

A transfer of technology developed in my U.S. Pat. No. 4,488,978 on calcium acetate pellets was unsuccessfully attempted for calcium acetate-chloride. A simple approach in the laboratory was to intimately blend finely divided $Ca(Ac)_2$ and $CaCl_2.2H_2O$, then add liquid water to promote chemical reaction and at the same time form pellets. The reaction is as follows:

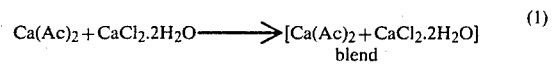

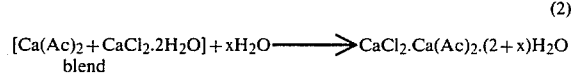

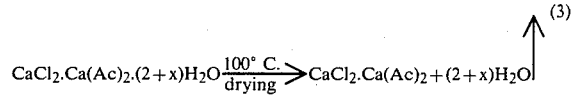

Whereas this simple approach worked, there were two important features that stood out as different from the $Ca(Ac)_2$ invention of my U.S. Pat. No. 4,488,978. First, pellets could not be produced using ~3 mols $H_2O$ per mol of calcium, as in the $Ca(Ac)_2$ case; instead ~12 mols of water were required. Secondly, it was extremely important in what order the water was added. Surprisingly, the process works well when the $Ca(Ac)_2$ raw material is dry, but when it is wet with as little as 2 mols $H_2O$ per mol of Ca, the synthesis is inoperable. This is so even when the final net amount of water in the undried product is made identical to that of a workable system. The 2 mols of water represent an upper limit on the amount produced through the neutralization reaction:

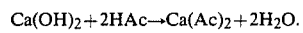

When wet $Ca(Ac)_2$ is used, the reaction is steered towards an undesirable intermediate, and the result is a single, wet mass as a reaction batch. This, as opposed to the "dry $Ca(Ac)_2$" approach in which the reaction batch never even goes through a sticky phase, but proceeds smoothly towards the final damp pellet. Once the wet reaction mass forms in the case of the wet-$Ca(Ac)_2$ approach, the reaction is irretrievably lost. Only upon prolonged standing will the wet mass harden, and then it can be physically broken into smaller bits. But sometimes even these products exhibit a tendency to deliquescence.

The first alternative approach is illustrated in Example I. Example II illustrates the unworkability of the wet-$Ca(Ac)_2$ approach.

EXAMPLE I 30.0 units of dry $Ca(Ac)_2$ powder were thoroughly blended with 27.9 units of $CaCl_2.2H_2O$ powder. To this blend 33.4 units of water were added slowly with stirring at room temperature until pellets were produced. The empirical composition of the pellets was $Ca(Ac)_2.CaCl_2.11.8H_2O$. Pellets were allowed to air dry, to constant weight. The new empirical composition of the hard, non-friable pellets was $Ca(Ac)_2.CaCl_2.9.3H_2O$, and contained the equilibrium level of water. Product was dried to constant weight at 100° C., to produce the anhydrous empirical entity $Ca(Ac)_2.CaCl_2$. The dense, hard character of the pellets is preserved.

EXAMPLE II 30.0 units of dry $Ca(Ac)_2$ powder were thoroughly blended with 6.8 parts of water. To this blend 27.9 units of dry $CaCl_2.2H_2O$ were added and thoroughly mixed at room temperature. As pelletizing water was added the reaction batch became pasty, with a "sandy" texture (contained crystals of unknown composition). Only 6.3 units of pelletizing water produced this wet, pasty reaction batch. Further addition of water was not attempted.

The second alternative approach is illustrated in Example III, where a stoichiometric excess of $Ca(Ac)_2$ over $CaCl_2$ is used in order to confer an improved stability upon the product pellets.

EXAMPLE III 30.0 units of dry $Ca(OH)_2$ were thoroughly blended with 54.1 units of dry $CaCl_2.2H_2O$. To this blend 48.6 parts glacial acetic acid were added dropwise with stirring at room temperature. Acid addition required 15 minutes. Nine minutes later pelletizing water was added drop-wise with stirring and this required 9 minutes. Total water relative to the anhydrous product was 45.2 units at this point. Pellets were uniformly white in color, and hard. The pellet diameters ranged from about 2 to about 9 mm, and averaged about 6 mm. Pellets were heated at 100° C. to constant weight. Empirical composition of the hard, dry pellets was $CaCl_2.1.1Ca(Ac)_2$.

The $Ca(Ac)_2$—$CaCl_2.2H_2O$ approach is only practical whenever there is a source of (dry) $Ca(Ac)_2$ available as well as a source of finely divided $CaCl_2.2H_2O$. The latter could be the fines in a dihydrate flaking or pelletizing operation. Or dihydrate flakes or pellets could be intentionally pulverized for use in the synthesis. At best, this route represents an undesirably high energy alternative to the double salt. Both raw materials have to be dried from solution, only to be hydrated again in the reactor, and then dried again during product drying.

The second alternative is improved as far as energy input is concerned. But it still requires drying of $CaCl_2$ solution—the most readily available primary source of $CaCl_2$—and rehydration, followed by final drying.

A preferred approach is one that utilizes $Ca(OH)_2$, or slaked lime, acetic acid, and $CaCl_2$ solution. My initial experiments centered on reacting $Ca(OH)_2$ with acetic acid to form the acetates, then adding the desired amount of $CaCl_2$ solution. These experiments failed, and will be treated in a broader context below. This failure prompted an alternative approach, the simultaneous addition of acetic acid and $CaCl_2$ solution to $Ca(OH)_2$, and the particular embodiment of this principle selected also failed. Finally, acetic acid and $CaCl_2$ were incorporated into the self-same solution, and this was used as the reagent to convert slaked lime to the desired double salt. While this approach was successful, it only worked over a narrow region of water content of the reagent solution.

For example, the value of y must fall between 9 and 11 when the value of x is 1 in the equation $$Ca(OH)_2 + 2HAc + x(CaCl_2 + y H_2O) \rightarrow Product.$$

Example IV illustrates a successful embodiment of this approach. Obviously, this final approach will also work as a simultaneous feeding of acetic acid and the appropriate $CaCl_2$ solution.

EXAMPLE IV

Reaction was carried out as follows:

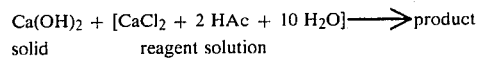

$$Ca(OH)_2 + [CaCl_2 + 2 HAc + 10 H_2O] \longrightarrow product$$
solid      reagent solution Reagent solution was prepared by dissolving 71.5 units of $CaCl_2.2H_2O$ and 58.4 units glacial acetic acid in 70.1 parts distilled water. To 20.0 units of dry $Ca(OH)_2$ were added 110.9 units of reagent solution with stirring, at room temperature. Solution addition spanned 73 minutes. The product was a soft, voluminous damp powder. It was converted to pellets upon slow addition of 11.0 units of water, with stirring. Product was successfully dried at 100° C.

It slowly became apparent through the continuing researches that whenever chloride was present, the neutralization of $Ca(OH)_2$ by acetic acid was inhibited. This was evidenced by the strong odor of acid over the reaction batch, as well as the subsequent poor storage behavior of the pellets. In other words, acid which was destined for neutralization of $Ca(OH)_2$ was being lost by volatilization. Thus in the second alternative approach above, where acid was added to a blend of $Ca(OH)_2$ and $CaCl_2.2H_2O$, this inhibition of the neutralization by chloride was responsible for the $CaCl_2/Ca(Ac)_2$ in balance in the final product. In like manner, addition of a solution containing both acid and $CaCl_2$ to $Ca(OH)_2$ generally failed because of this inhibitory function of chloride.

It seemed at this point that a successful approach would require complete neutralization of $Ca(OH)_2$ by acid first followed by addition of $CaCl_2$.

Returning to the $CaCl_2$ solution approach initially found to be unsuccessful therefore, the program was resumed using different water levels in the $CaCl_2$ solution until success was attained. Example V describes a series of such runs in which only the $CaCl_2$ solution concentration varies. It is evident that, contrary to expectation, the more dilute systems worked, to a point, better than the more concentrated ones. Evidently, for strong $CaCl_2$ solutions, hard pellets are initially formed as solution is added to the $Ca(Ac)_2$. But this locks unreacted $Ca(Ac)_2$ into pellet interiors where it is not accessible to the remainder of the incoming $CaCl_2$. The latter then becomes excessive at the exterior sites of the pellets, and gives rise to a solution phase there. Hence an undesirable product.

EXAMPLE V $Ca(Ac)_2$ was prepared by reacting, for example, 14.0 units of $Ca(OH)_2$ with 23.1 units glacial acetic acid to form $Ca(Ac)_2 + 2H_2O$. A series of reactions was performed in which this wet $Ca(Ac)_2$ was reacted with a solution designated as $CaCl_2 + xH_2O$. Thus, $$[Ca(Ac)_2 + 2H_2O] + [CaCl_2 + xH_2O] \rightarrow Product$$

All runs were made at room temperature. In the following table, the value of x in each case is given along with a brief characterisation of the resulting reaction batch.

| x | Reaction Batch Character |
|---|---|
| 6 | single, wet aggregate, "sandy" texture |
| 8 | large, wet aggregates |
| 10 | coarse, uniform powder, non-sticky |
| 12 | coarse, soft damp powder, non-sticky |
| 13 | sl. sticky coarse powder |

| x | Reaction Batch Character |
|---|---|
| 14 | wet, sticky solid |

Results show that when x ranges from 10 to 12, a good product is obtained. This represents an optimum in the middle of the study range. The total amount of water in these experiments is x+2. Thus, from 12 to 14 mols of water per mol of double salt result in a completion of the reaction to form the double salt, and at the same time a sticky phase is avoided. More water than the optimum produces a sticky phase. Less than the optimum amount of water results in an undesirable $CaCl_2/Ca(Ac)_2$ inbalance and resultant product inhomogeneity.

Products of the above optimum reactions were pelletized upon addition of more water, with stirring. Products could have been dried at room temperature or at 100° C. without having undergone pelletization.

The Example V approach is a versatile one because it allows a broad range of $CaCl_2$ to be added conveniently to $Ca(Ac)_2$, from a little over zero, to one mol $CaCl_2$ per mol of $Ca(Ac)_2$. Thus a range of physical and chemical properties is available to the user. This is useful in the aforementioned tradeoff between environmental pollution and positive ice-melting attributes.

As the relative $CaCl_2$ input is decreased, a more dilute $CaCl_2$ solution can be tolerated in the synthesis. This can be illustrated by a simple numerical example. If dry $Ca(Ac)_2$ is input to the process, about 3.3 mols water per mol of calcium is an upper limit on input pelletization water according to my U.S. Pat. No. 4,488,978 on Ca-(Ac)$_2$ pellets. Assume for example a $CaCl_2/Ca(Ac)_2$ ratio in the final desired double-salt compound of 1/10. The pelletization water requirement can be approximated to remain at 3.3 mols per mol of $Ca(Ac)_2$. The wet compound can then be empirically expressed

$Ca(Ac)_2.1/10CaCl_2.3.3H_2O$.

This translates to the use of the solution

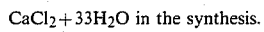
$CaCl_2+33H_2O$ in the synthesis.

Referring to Example V, it means that x takes on the value of 33. Even lower $CaCl_2/Ca(Ac)_2$ ratios can be examined, and the value of x will be seen to increase even further.

Another consequence of a decrease in the desired $CaCl_2/Ca(Ac)_2$ ratio in the final product is that the order of reagent addition can now be changed. Whereas $CaCl_2$ was found to inhibit acid neutralization of lime, such that $CaCl_2$ had to be added last in the synthesis, the latter restriction is removed for $CaCl_2/Ca(Ac)_2$ ratios appreciably lower than unity. Thus, for example, the following sequence can be successfully executed:

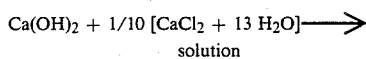
$Ca(OH)_2 + 1/10 [CaCl_2 + 13 H_2O] \longrightarrow$ (1)
solution

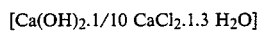
$[Ca(OH)_2.1/10\ CaCl_2.1.3\ H_2O]$

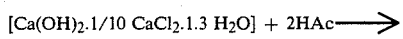
$[Ca(OH)_2.1/10\ CaCl_2.1.3\ H_2O] + 2HAc \longrightarrow$ (2)

$Ca(Ac)_2.1/10\ CaCl_2.2.2\ H_2O$

The value of x (Example V) in this $CaCl_2$ solution happens to be 13, but it can easily be shown that higher values yet can be employed as the desired $CaCl_2/Ca(Ac)_2$ ratio in the product is increased.

All limestone contains some magnesium, with an upper limit of $Mg/Ca=1$ to be found in dolomitic limestone. An investigation was carried out to determine the effects of contained magnesium in slaked lime upon the stability of the double salt. Surprisingly it was found that only so much $CaCl_2$ could be added to calcium/magnesium acetate which matched the amount of calcium acetate present. Of course, less than this amount of $CaCl_2$ could be incorporated, just as in the case of calcium acetate free of magnesium. Example VI describes a series of runs in which calcium/magnesium hydroxides were reacted with acetic acid. The products were then each "titrated" with $CaCl_2$ solution until favorable pellet character just began to deteriorate. This point was reached in all cases when $CaCl_2/Ca(Ac)_2=1$, regardless of Mg content. It is evident from the empirical compositions of these product salts that there is chemical bonding manifest, however weak. The evidence for this is the differing amount of water held by the double-salt component as the Mg/Ca content of the overall compound varies. If purely physical mixtures were forming, that water referred to would have remained constant throughout the series. Thus, I present evidence for the existence of the triple salt for the first time.

EXAMPLE VI 70 parts $Ca(OH)_2$ were intimately mixed with 55 parts $Mg(OH)_2$, and the blend treated with 23.1 parts glacial acetic acid. To the resulting product was added 24.1 parts of 43.5% $CaCl_2$ solution. Product was non-sticking, and free flowing. It was exposed to ambient air, and its weight change monitored. At constant weight the empirical formula was $CaCl_2.Ca(Ac)_2.4.85H_2O.Mg(Ac)_2.4H_2O$. Other runs were similarly performed, and the formulas for all runs in the series are as follows:

1. $CaCl_2.Ca(Ac)_2.3.41H_2O.2(Mg(Ac)_2.4H_2O)$
2. $CaCl_2.Ca(Ac)_2.4.85H_2O.Mg(Ac)_2.4H_2O$
3. $CaCl_2.Ca(Ac)_2.7.84H_2O.\frac{1}{2}(Mg(Ac)_2.4H_2O)$
4. $CaCl_2.Ca(Ac)_2.8.42H_2O.\frac{1}{3}(Mg(Ac)_2.4H_2O)$ Note that the extreme end members of such a series would be $Mg(Ac)_2.4H_2O$ and $CaCl_2.Ca(Ac)_2.9H_2O$. The fact that the total amount of water differs from one composition to the next attests to the chemical nature of the bonding. Otherwise they would be interpreted as simple mixtures.

Further evidence for chemical bonding was afforded when Sample 2 of the above series was completely dissolved in water and allowed to evaporate in ambient atmosphere. A single crystalline species developed out of solution as fine needles. Neither were any dendrites formed. Sample 2 also represents the highest Mg/Ca ratio attainable using a natural limestone base. Sample 1 is shown to illustrate the trend of water content within an extended series.

Finally, Example VII is provided to illustrate the character of the product when a deficiency of $CaCl_2$ is used in the synthesis, in this case where $CaCl_2/Ca(Ac)_2=\frac{1}{2}$.

EXAMPLE VII 14.0 units of $Ca(OH)_2$ were reacted with 23.1 units of glacial acetic acid to produce a flowable powder. To this product 24.1 units of 43.5% $CaCl_2$ solution was introduced with stirring. The result was a dry, free-flowing coarse powder having the empirical composition Ca(Ac)$_2$.½CaCl$_2$.4.86H$_2$O. Product was allowed to stand in air. At constant weight the empirical formula was Ca(Ac)$_2$.½CaCl$_2$.4.56H$_2$O.

This can be rearranged to give

Ca(Ac)$_2$+Ca(Ac)$_2$.CaCl$_2$.9.13H$_2$O.

It is at once evident that product is an intimate mixture of Ca(Ac)$_2$ and the double salt.

In order to pelletize the equilibrated sample, 8.2 units of water were required. Pellets were allowed to stand in air, and water loss was monitored. At constant weight the composition Ca(Ac)$_2$+Ca(Ac)$_2$.CaCl$_2$.9.13H$_2$O was again attained. Pellets were hard and non-friable. They were then dried at 100° C. for 6½ hours. They remained hard and non-friable, and had the composition CaCl$_2$.2Ca(Ac)$_2$.

It appears that the Example VII product is an equimolar mixture of Ca(Ac)$_2$ and the double salt Ca(Ac)$_2$.CaCl$_2$.9.13H$_2$O. Note however, that when the non-deliquescent mixture dissolves in water in its action as a deicer (or a freezing point depressant), it exhibits a composite of deicing properties. That is, its effective eutectic temperature will be somewhere between that of Ca(Ac)$_2$ which is unacceptable and that of CaCl$_2$ which represents "overkill" in most deicing situations.

The very easy, low-energy synthesis of [Ca(Ac)$_2$.CaCl$_2$.9.13H$_2$O+Ca(Ac)$_2$] is to be contrasted to a conventional crystallization-from-solution route. Most probably there is not a single crystal species ½CaCl$_2$.Ca(Ac)$_2$.wH$_2$O which can be crystallized from solution as a distinct entity. Even if there were, a lengthy investigation of phase diagrams would be required to define the crystallization parameters. These would allow prediction, among other things, as to whether an evaporative crystallization or a temperature-cycle crystallization is feasible. Even at best, the crystallization route involves an increase in the number of operations, necessitating increased cost of equipment and increased energy input.

In this case a simpler approach to the dry product than crystallization would be to produce an aqueous solution containing Ca(Ac)$_2$ and CaCl$_2$ in the mol ratio 2:1, and then to dry the entire solution by a spray-drying or flaker drying technique. Energywise, this is far more costly than the process of the present invention. Furthermore, a spray-dried product is unacceptable in its physical form for roadway deicing. And flaker-drying, while never reduced to practice, could produce an unacceptably friable product.

The products of the present invention require minimal drying. As Example VII illustrates, products can be dried using two different approaches. They can either be dried down to a lowest practical water content at the particular temperature selected, e.g., 100° C. Or, they can be dried only to the water content representing an equilibrium state at the temperature and relative humidity conditions prevailing during open storage. The first-named water level is found experimentally in temperature-time studies.

When magnesium is absent, the water in the double salt is driven off relatively easily at 100° C., and a virtual anhydrous state of the product is reached. Such a product will retain its desirable physical character. It will remain anhydrous if stored in closed containers. But if exposed to ambient atmosphere, it will slowly pick up water without passing through a deliquescent transition, and come to rest at the aforementioned equilibrium water level.

When Mg is present, it is not practical to attempt to attain the anhydrous state, although it can indeed by done. Instead, the compounds are heated at a practical temperature such as 100° C. for a practical time period, and the resultant reduced water level is accepted. Again, if exposed to ambient atmosphere these compounds will slowly absorb water without passing through a deliquescent stage and cease gaining weight at the aforementioned equilibrium level. For example, the compound CaCl$_2$.Ca(Ac)$_2$.4.85H$_2$O.Mg(Ac)$_2$.4H$_2$O was heated at 100° C. for several days. The resulting composition was CaCl$_2$.Ca(Ac)$_2$.Mg(Ac)$_2$.2.18H$_2$O. Also, the compound CaCl$_2$.Ca(Ac)$_2$.7.84H$_2$O.½(Mg(Ac)$_2$.4H$_2$O) was heated at 100° C. for 3½ hours. Its composition became CaCl$_2$.Ca(Ac)$_2$.½(Mg(Ac)$_2$.3.05H$_2$O). Upon standing in air, these dried samples came to constant weight at their previously attained equilibrium levels.

The reason for the more difficult drying when Mg is present is attributable to the tendency for the Mg(Ac)$_2$ component to tenaciously hold water. At ambient, the compound Mg(Ac)$_2$.4H$_2$O is the well-known stable equilibrium species. Calcium acetate, on the other hand, has no stable hydrate at ambient, although fine Ca(Ac)$_2$ powders may hold a small amount of physisorbed water.

Compounds of the present invention, regardless of their Mg content, need not be anhydrous to store well or to function as deicers. Nor are any products of the invention deliquescent when stored in atmosphere. Obviously the less contained water, the lower the shipping cost. Especially when Mg is present, therefore, there will be an economic trade-off between product drying costs and product shipping costs.

Product drying is optional, depending on the circumstandes. The product of Example VII required little or no drying inasmuch as the synthesis automatically yielded a water content very close in value to the equilibrium level. The product of this example can be produced, and then bagged or stored in bulk directly, with no further treatment. For some end use purposes this coarse powder may be acceptable. To produce a pellet, however, required pelletization water, as illustrated in Example VII. Now this "excess" water in Example VII pellets can be reduced to one or another level, or anywhere in between: It can be completely removed at 100° C. to yield an acceptable pellet; or it may be dried (at ambient or at 100° C.) to its equilibrium level. In any event a non-friable pellet is produced, which is suitable for storage and handling, and is particularly well suited for deicing by virtue of its particle size distribution.

Pelletizing is also optional, depending on the circumstances. When Mg is absent, pelletizing is always required if an ideal deicer pellet is the desired product. For other end-use purposes, pelletizing may not be necessary; the coarse powder emerging from the reactor and (optionally) the dryer may be suitable. When Mg is present, product tends to pelletize itself automatically in the reactor. Such material may be acceptable as such for deicing, or it can be improved further in physical form by virtue of a separate pelletizing step.

The best of all circumstances happens when a particular desired tailor-made product requires neither pelletization nor drying. The only problem to be faced here is whether the inevitable contained water can be tolerated in shipping. Again, there is an economic trade-off between drying and shipping costs.

The industrially important source of calcium base for processes of the invention is calcined natural limestone. Unslaked lime can be used in all embodiments of the invention, but slaked lime is preferred from the standpoint of control of the neutralization reaction between acetic acid and lime. Unslaked lime is a preferred option when it is desired to reduce water input to the processes in order to compensate for an undesirable degree of dilution of one or more of the other input streams. For example, a low cost source of by product acetic acid may be available, but at a concentration lower than 100%. Likewise a CaCl$_2$ liquor may be available it a concentration lower than desired.

The processes of invention are versatile in that they may employ any source of natural limestone, regardless of magnesium content.

It should be obvious to one skilled in the art that magnesium may be introduced to the products by way of the CaCl$_2$ solution as well as the lime itself. Thus a pure CaCl$_2$ solution free of MgCl$_2$ is not necessary to the practice of the invention.

Although this invention has been described in connection with specific forms thereof, it will be appreciated by those skilled in the art that a wide variety of equivalents may be substituted for those specific elements and steps of operation shown and described herein, that certain features may be used independently of other feature, and that parts may be reversed, all without departing from the spirit and the scope of this invention as defined in the appended claims.

I claim:

1. A process for manufacturing calcium acetate-chloride comprising the following steps:
   (a) dry-blending calcium acetate powder and calcium chloride dihydrate powder such as the mol ratio of calcium chloride to calcium acetate ranges from greater than zero, to one;
   (b) adding water to the dry-blend with agitation until pellets are formed; and
   (c) drying the pellets to the desired water level in the product.

2. A process for manufacturing calcium acetate-chloride comprising the following steps:
   (a) dry-blending finely divided calcium hydroxide or oxide with calcium chloride dihydrate powder such that the mol ratio of calcium chloride to calcium hydroxide or oxide is greater than zero, but less than or equal to one;
   (b) adding, with agitation, concentrated acetic acid to the dry-blend such that the amount of acid is stoichiometrically equivalent to the quantity of calcium hydroxide or oxide contained in said dry-blend.

3. The process of claim 2 wherein said calcium hydroxide or oxide is in the form of slaked or unslaked lime, respectively.

4. The process of claim 2 wherein the concentration of acetic acid is 100%.

5. The process of claim 2 wherein the mol ratio of calcium chloride to calcium hydroxide or oxide is less than one.

6. A process for the manufacture of calcium acetate-chloride comprising adding an aqueous solution of acetic acid and calcium chloride to calcium hydroxide or oxide with agitation according to the chemical reaction equation:

$$Ca(OH)_2 + \{2HAc + x(CaCl_2 + yH_2O)\} \rightarrow Product$$

where the ratio x/Ca(OH)$_2$ ranges from greater than zero to unity, and the value of y is at least 9.

7. The process of claim 6 wherein the calcium hydroxide or oxide is in the form of slaked or unslaked lime, respectively.

8. The process of claim 6 wherein the value of y is at least 10.

9. A process for the manufacture of calcium acetate-chloride comprising adding an aqueous solution of calcium chloride to calcium acetate with agitation according to the following chemical reaction equation:

$$Ca(Ac)_2 + w\{CaCl_2 + zH_2O\} \rightarrow Product$$

wherein the value of z is at least 9 and the ratio w/Ca(Ac)$_2$ ranges from greater than zero to one.

10. The process of claim 9 wherein the value of z is at least 10.

11. The process of claim 9 wherein said calcium acetate is the product of the stoichiometric reaction of lime with concentrated acetic acid.

12. The process of claim 11 wherein the concentration of said acetic acid is 100%.

13. A process for the manufacture of calcium acetate-chloride comprising the following steps:
   (a) adding an aqueous solution of calcium chloride to slaked or unslaked lime according to the chemical reaction scheme $$Ca(OH)_2 + z\{CaCl_2 + wH_2O\} \rightarrow Product$$

wherein the ratio of z/Ca(OH)$_2$ can be varied from greater than zero to less than unity, and the value of w is at least 10; and
   (b) to the product of (a), adding an amount of concentrated acetic acid stoichiometrically equivalent to the lime contained therein.

14. The process of claim 13 wherein the concentration of said acetic acid is 100%.

15. The process of claim 9 wherein up to ⅔ of the calcium in said calcium acetate is replaced by magnesium, on a molar basis.

* * * * *